United States Patent
Sato

(10) Patent No.: US 6,219,422 B1
(45) Date of Patent: Apr. 17, 2001

(54) DATA TRANSMITTING APPARATUS, RECEIVING APPARATUS, AND DATA TRANSMISSION AND RECEPTION SYSTEM

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/035,400

(22) Filed: Mar. 5, 1998

(30) Foreign Application Priority Data

Mar. 19, 1997 (JP) .................................... 9-066538

(51) Int. Cl.$^7$ ............................. H04N 7/167; H04N 7/16
(52) U.S. Cl. ......................... 380/240; 380/210; 380/280
(58) Field of Search .................................... 380/200, 205, 380/210, 240, 270, 278, 279, 280; 713/162, 163

(56) References Cited

U.S. PATENT DOCUMENTS

| | | | |
|---|---|---|---|
| 4,533,949 | * 8/1985 | Fujimura et al. | 358/122 |
| 4,613,901 | * 9/1986 | Gilhousen et al. | 358/122 |
| 5,341,425 | * 8/1994 | Wasilewski et al. | 380/20 |
| 5,574,787 | * 11/1996 | Ryan | 380/5 |
| 5,740,246 | * 4/1998 | Saito | 380/21 |
| 5,761,302 | * 6/1998 | Park | 380/5 |
| 5,953,418 | * 9/1999 | Bock et al. | 380/20 |

FOREIGN PATENT DOCUMENTS

| | | | |
|---|---|---|---|
| 0 450 841 | 10/1991 | (EP) | H04N/7/16 |
| 0 679 027 | 10/1995 | (EP) | H04N/5/926 |
| 2 296 171 | 6/1996 | (GB) | H04N/7/167 |

OTHER PUBLICATIONS

Saini, J.S., "The BBC Select Decoder," Broadcasting Convention, 1992. IBC., International, 1992, pp. 410–413.*

"Functional Model of a Conditional Access System" EBU Review—Technical, No. 266, Dec. 21, 1995, pp. 64–77, XP000559450.

Giachetti J –L et al: "A Common Conditional Access Interface for Digital Video Broadcasting Decoders" IEEE Transactions on Consumer Electronics, vol. 41, No. 3, Aug. 1995, pp. 836–841, XP000539543.

Schooneveld Van D: "Standardization of Conditional Access System for Digital Pay Television" Philips Journal fo Research, vol. 50, No. 1/02, Jul. 1996, pp. 217–225, XP000627672.

* cited by examiner

Primary Examiner—Jim R Suia
Assistant Examiner—Justin T. Darrow
(74) Attorney, Agent, or Firm—Frommer Lawrence & Haug, LLP.; William S. Frommer; Darren M. Simon

(57) ABSTRACT

Video and audio data of a plurality of received programs and a common information ECM are recorded to a recording medium. A recording position of the program is written on a management table. When reproducing a desired one of the recorded programs, the ECM is also reproduced together with the video and audio data. The data to retrieve the desired program and an individual information EMM are transmitted through a broadcasting wave. To descramble the reproduced video and audio data, the reproduced ECM and the received EMM are used. Since the individual information EMM is the latest information, even if there is a time lag between the recording time point and the reproducing time point, the reliability of the conditional access is not deteriorated.

6 Claims, 4 Drawing Sheets

DATA TRANSMITTING APPARATUS, RECEIVING APPARATUS, AND DATA TRANSMISSION AND RECEPTION SYSTEM

BACKGROUND OF THE INVENTION

1. Field of the Invention

The invention relates to a data transmitting apparatus, a receiving apparatus, and a data transmission and reception system for recording digital data which is transmitted via, for example, a digital satellite broadcasting onto a storage medium.

2. Description of the Related Art

Recently, a digital broadcasting system for transmitting multimedia data such as image signal, audio signal, and the like by using a communication satellite has been being put into practical use. The invention can be applied to such a digital broadcasting system. FIG. 4 shows an outline of a typical digital broadcasting system. The transmission side of a program is made up of an up-link station, a program provider, and a management system.

Video and audio data from a program provider 101 is supplied to an encoder and multiplexer 103 of the MPEG (Moving Pictures Expert Group) 2 of an up-link station 102. In the MPEG 2 encoder and multiplexer 103, the video and audio data is compressed and the compressed video and audio data is stored in a packet of a length of 188 bytes. A plurality of programs and the packets of the respective corresponding video and audio data are multiplexed, so that a transport packet of the MPEG2 is formed. A transport stream is formed by a series of transport packets. The number of transport streams corresponds to the number of transponders installed in the communication satellite.

The MPEG2 transport stream is supplied to a transmission system 104. In the transmission system 104, processes such as scrambling process of every packet, error correction encoding of every packet, modulation, and the like are executed and a modulation output is supplied to a transmitting antenna 105. The scrambling process is necessary to realize a conditional access which is used to control about the permission or inhibition of the monitoring every viewer. In the scrambling process, for example, a contract of a pay-per-view in which only a certain program is monitored with a toll every time can be made. A key to descramble is supplied from a key management system 106 to the MPEG2 encoder and multiplexer 103 and has been inserted as one of the packets into the transport stream in a manner similar to the video and audio information.

An integrated management of the MPEG2 packets is performed by a program management system 107. The program management system 107 and key management system 106 are unified, thereby encrypting the key to descramble. Further, in a customer management system 108, items regarding a monitor contract or the like are managed. Viewer information is transmitted and received betweem the customer management system and the home of the viewer via a telephone line 109.

A broadcasting radio wave transmitted from the transmitting antenna 105 through a communication satellite 110 is received by a receiving antenna 111 at each home. A receiver 112 is connected to the receiving antenna 111. The receiver 112 is constructed by a tuner for designating a receiving transponder, a demodulating unit, a descrambling unit for descrambling, a demultiplexer for designating a packet to be separated, a video decoding unit, an audio decoding unit, and the like. The decoded video and audio signals are supplied to a television receiver 113.

A key for descrambling is encrypted and transmitted as concerned information together with video and audio signals. The key to decrypt the encryption has been stored in an IC card 114 inserted in the receiver 112. Which program can be descrambled can be controlled from the transmission side on the basis of contract-information of each reception system. The receiver having a conditional accessing function is usually called an IRD (Integrated Receiver/Decoder).

The above digital satellite broadcasting system is not limited to an application field such that a television broadcasting is merely monitored but can be also used as a transmission system of digital data of a large capacity by many channels. That is, the receiver of the digital satellite broadcasting can have a function as a receiving apparatus of digital data such as video and audio data, data for a computer, or the like.

As one of using methods of the digital satellite broadcasting, there is considered a method whereby by combining a receiver and a recording medium of a large capacity, a large quantity of reception data can be accumulated. For example, the reception data is recorded at night when a transmitting line is relatively free, and a desired portion is reproduced from the recorded data later. As a recording medium of a large capacity, a digital VCR, a hard disk, an optical disk, a semiconductor memory, or the like can be used.

In the digital satellite broadcasting, although a form in which a monitor contract is made on a channel unit basis, a form (pay-per-view) in which a fee of only the monitored programs is paid, and the like exist, it is-generally a toll broadcasting and the conditional access is used. Therefore, according to the method whereby reception data has previously been stored in the memory of the large capacity and the desired program is reproduced later, it is irrational that all of the programs which are stored are charged. The programs which were selectively read out from the memory and were reproduced are charged.

The monitor control in the toll broadcasting system is performed by a scramble authorization system. In this system, individual information (EMM: Entitlement Management Message) that was formed on the transmission side and is peculiar to the receiving terminal is sent to the viewer. On the receiving terminal, the EMM of the same ID as the own ID is decrypted, and a work key is fetched into the IC card. The key to decode the EMM is a key which is individual for each receiving terminal and has previously been stored in the IC card. Further, a contracted channel ID and a contract type (temporary contract, pay-per-view, or the like) in addition to the work key are included in the EMM.

When a program is monitored, common information (ECM: Entitlement Control Message) which is accompanied with the program and is common for the receiving terminals is fetched into the IC card. If the work key corresponding to this channel has previously been stored, a descrambling is performed and can be monitored. The EMM and the common information (hereinafter, referred to as an ECM) are transmitted in a form of the packet of the transport stream of the MPEG2 in a manner similar to the video and audio data. In case of the pay-per-view, the monitor information is periodically up-loaded through the telephone line.

In the foregoing toll broadcasting system, as one of methods of realizing a method whereby the recording medium (large capacity memory) is combined to the receiver and a desired one of the programs stored in the recording medium is selectively reproduced and only the reproduced program is charged, a method of recording the EMM and ECM as well to the recording medium is also considered. The video and audio data of a plurality of programs are recorded in a scrambled state (form of the packet) on the recording medium, the video and audio data which was selectively reproduced is descrambled by the system of the receiver, and is further decoded. In order to enable the descrambling, the EMM and ECM are recorded to the recording medium.

However, a time lag exists between the timing when recording the reception data to the recording medium and the timing when reproducing it later. There is a possibility such that the EMM which is individual for each receiving terminal is changed due to a change or the like in contract. Thus, according to the system for recording the EMM at that time point together with the data of the program, there occurs a fear such that the reliability of the conditional access is deteriorated. For example, upon recording, although the customer which is instructed in the EMM has a right corresponding to the rank of the recorded program, at the time of point of reproduction, even if the right has already been terminated due to the elapse of the validity term, the right is authorized on the EMM which has already been recorded. In an extreme case, a situation such that the right which was validated by the latest EMM is invalidated by the reproduced old EMM also occurs.

OBJECTS AND SUMMARY OF THE INVENTION

It is, therefore, an object of the invention, to provide a data transmitting apparatus, a receiving apparatus, and a data transmission and reception system which can prevent a situation such that the reliability of a conditional access is deteriorated by controlling the reproduction of recorded data by latest individual information.

According to the invention, to solve the foregoing problems, there is provided a data transmitting apparatus for transmitting multiplexed digital data, characterized by comprising:

means for encrypting a plurality of information data;
means for transmitting first control data which is used to decrypt the encryption and is common to receiving terminals and second control data which is used to decrypt the encryption and is individual for the receiving terminals together with the plurality of encrypted information data; and
means for transmitting data necessary to retrieve the plurality of information data and the present second control data after the plurality of encrypted information data was transmitted.

According to the invention, there is also provided a data receiving apparatus for receiving multiplexed digital data, characterized in that a plurality of encrypted information data, first control data which is used to decrypt the encryption and is common to receiving terminals, and second control data which is used to decrypt the encryption and is individual for the receiving terminals are included in a reception signal, and the apparatus comprises:

a recording medium for recording the plurality of encrypted information data and the first control data;
managing means for instructing a recording position of each of the plurality of information data on the recording medium;
means for reproducing desired information data and the first control data from the recording medium with reference to the managing means; and
means for decrypting the reproduced information data by using the reproduced first control data and the present second control data received.

According to the invention, there is further provided a data transmission and reception system for transmitting multiplexed digital data and receiving the multiplexed digital data, characterized in that an apparatus on the transmission side comprises:
means for encrypting a plurality of information data; and
means for transmitting first control data which is used to decrypt and is common to receiving terminals and second control data which is used to decrypt and is individual for the receiving terminals together with the plurality of encrypted information data,
and an apparatus on the reception side comprises:
a recording medium for recording the plurality of encrypted information data and the first control data,
managing means for instructing a recording position of each of the plurality of information data on the recording medium;
means for reproducing desired information data and the first control data from the recording medium with reference to the managing means; and
means for decrypting the reproduced information data by using the reproduced first control data and the present second control data received.

According to the transmitting apparatus of the invention, since the data for retrieving a plurality of information data and the second control data EMM are transmitted, the plurality of information data can be easily retrieved on the reception side. Since the encryption is decrypted by the latest EMM on the reception side, the reliability of the conditional access is not deteriorated. In the receiving apparatus, the plurality of information data received and the first control data ECM are recorded to the recording medium and the reproduced first control data ECM and the received second control data EMM are used to decrypt the information data which was selectively reproduced, so that the deterioration of the reliability of the conditional access can be prevented.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
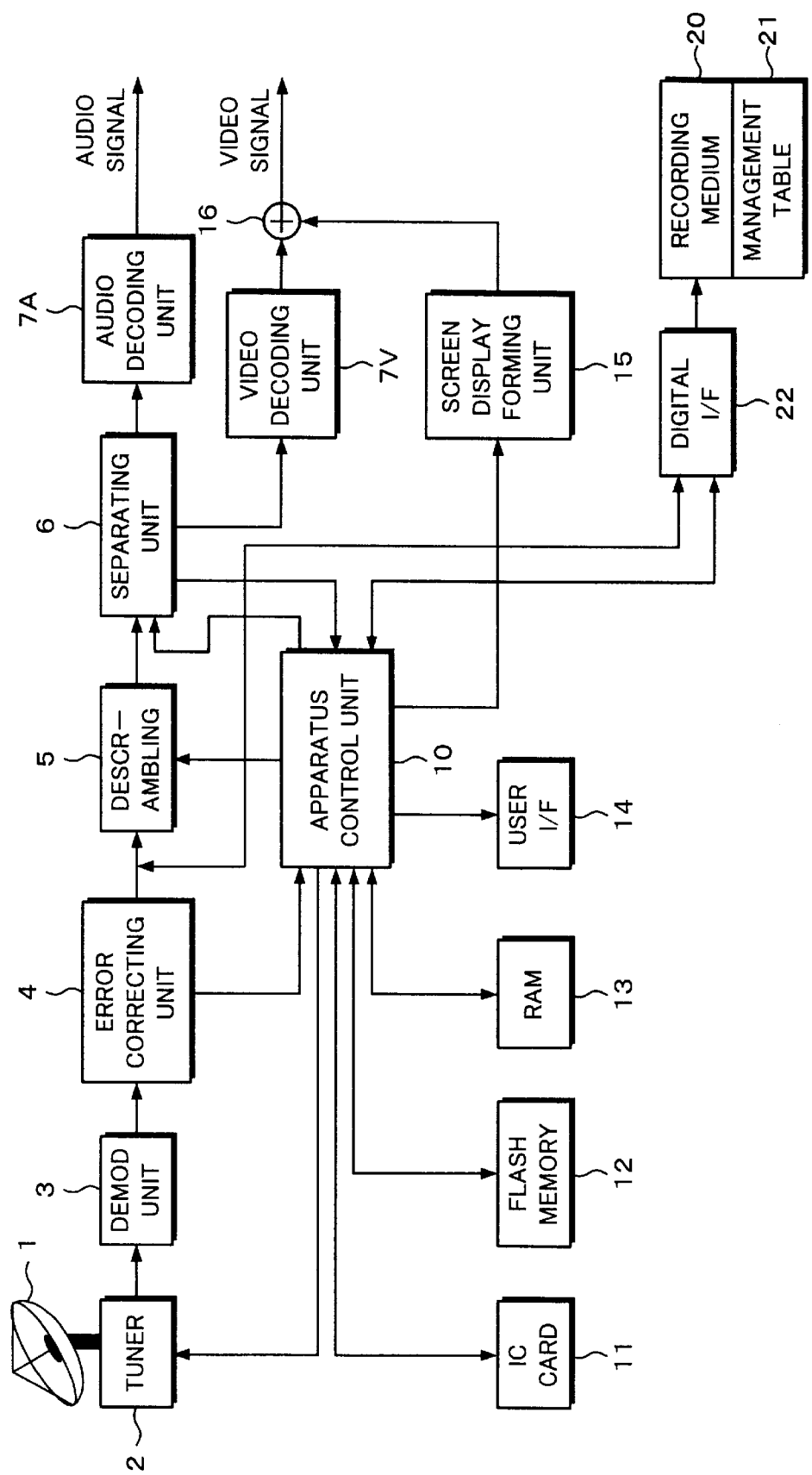
FIG. 1 is a block diagram showing a construction of an embodiment of the invention.

An embodiment of the invention will now be described hereinbelow with reference to the drawings. FIG. 1 is a block diagram showing the embodiment. A receiving antenna shown at 1 receives a radio wave from a communication satellite (or broadcasting satellite). A converter associated with the antenna 1 down-converts the reception signal into a first IF (intermediate frequency) signal of a predetermined frequency and generates to a tuner 2.

In the tuner 2, a receiving channel (namely, receiving transponder) set by the user is selected and a second IF signal is formed. The second IF signal is supplied to a demodulating unit 3 and, for example, a QPSK is demodulated. A demodulation output from the demodulating unit 3 is supplied to an error correcting unit 4. The error correcting unit 4 corrects errors occurring during the transmission by an error correction code such as a Reed Solomon code. An output (transport stream) of the error correcting unit 4 is supplied to a descrambling unit 5. In the descrambling unit 5, a descrmable to cancel the scramble is performed.

The transport stream of the MPEG2 which is an output of the descrambling unit 5 is supplied to a separating unit 6. In the separating unit 6, the packet of a desired channel is separated from the transport stream. It is also separated into video data, audio data, and control data (the ECM and EMM and the like are included) on the basis of information of a header portion. Further, a switching between the data of the received program and the data of the program which was selectively reproduced from the recording medium is also performed.

The video data from the separating unit 6 is decoded by a video decoding unit 7V and a reception video signal is generated. The audio data is decoded by an audio decoding unit 7A and a reception audio signal is generated. The control data (including the EMM and ECM) is supplied to an apparatus control unit 10. The decoded video signal is added with a signal for display by an-adder 16. An output video signal of the adder 16 is displayed on a display (not shown). Similarly, the decoded audio signal is, for instance, amplified by an amplifier and outputted from a speaker (not shown). A PID is added to the transport packet and a transmission destination (video decoding unit 7V, audio decoding unit 7A, or apparatus control unit 10) of the packet is instructed by the PID.

The apparatus control unit 10 controls the operation of the whole receiver and is constructed by a microcomputer. The tuner 2, an IC card 11, a flash memory 12, an RAM 13, a user interface 14, and a screen display forming unit 15 are connected to the apparatus control unit 10. Further, bit error rate information is supplied from the error correcting unit 4 to the apparatus control unit 10. Since a bit error rate has a correlation with a C/N ratio, the apparatus control unit 10 can know a radio wave situation (C/N ratio) from the bit error rate information. A degree of C/N ratio can be displayed on the screen of the display. Thus, the adjustment of the direction of the antenna, permission or inhibition of the down-loading of the program, and the like can be controlled.

The user interface 14 is keys on a front panel, a pointing device such as screen display, mouse, or the like, a remote control system, or the like. Although not shown, a modem is connected to the apparatus control unit 10 and viewer information is transmitted via the telephone line.

A program for controlling the ordinary operation is stored in the flash memory 12. The control of the ordinary operation which is executed by the apparatus control unit 10 is executed on the basis of the program stored in the flash memory 12. The RAM 13 is used as a temporary storing unit when rewriting the flash memory 12. The screen display forming unit 15 forms various display signals under the control of the apparatus control unit 10. The display signals are supplied to the adder 16 and multiplexed to the decoded video signal.

A recording medium 20 is connected to the receiver through a digital interface 22 in order to record the data of a plurality of programs received by the receiver by using free time such as at night or the like as mentioned above and to selectively reproduce a desired program among them after that. As a recording medium 20, a medium of a large capacity is preferable and a digital VCR (video cassette tape recorder), a hard disk, an optical disk, or the like can be used. A management table 21 is used in association with the recording medium 20. The management table 21 shows a corresponding relation between the recorded data, for example, an ID (program number) of the program and information of its recording position. Although a control unit, a mechanism unit, and the like are provided in association with the recording medium 20, they are not shown for simplicity of explanation.

As a management table 21, an area on the same medium as that of the recording medium 20 can be used or an area on another medium can be also used. For example, in case of the digital VCR, the management table can be constructed in a semiconductor memory built in a cassette or a surface of the cassette. In case of the semiconductor memory, a directory area on the memory can be used.

The previous data of the descrambling unit 5, namely, the video and audio data in the scrambled state is recorded on the recording medium 20 through the digital interface 22. The apparatus control unit 10 and digital interface 22 are connected and the ECM associated with the video and audio data of the program to be recorded is also recorded. Since the ECM and EMM are information for control, they are not scrambled. However, the EMM as individual control data is not recorded in the receiver. This is because the EMM received at the newest real time is to be used as the EMM.

Further, control information necessary to record and reproduce the data to/from the recording medium 20 is also transmitted from the apparatus control unit 10 through the digital interface 22. The reproduced data, namely, the video data and audio data of the selected program are supplied to the descrambling unit 5 through the digital interface 22. The reproduced ECM associated with the selected program is supplied to the apparatus control unit 10 through the digital interface 22. By using the reproduced ECM and the received present (namely, latest) EMM, the apparatus control unit 10 generates a scramble key that is necessary for descrambling the reproduced video and audio data. Thus, the descrambled video and audio data is obtained.

Figure 2:
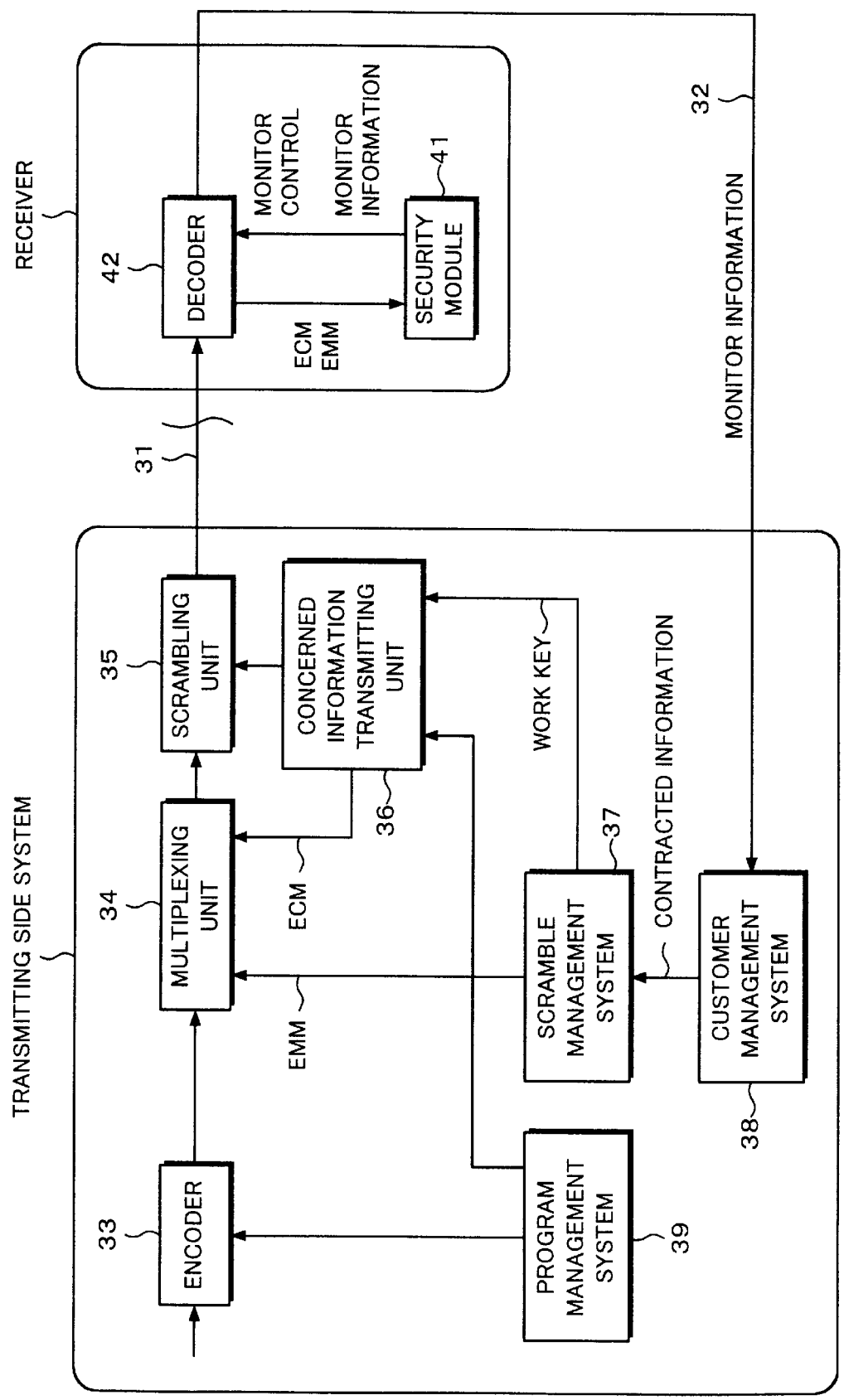
FIG. 2 is a block diagram showing a construction mainly about the monitor control in the embodiment of the invention.
Figure 4:
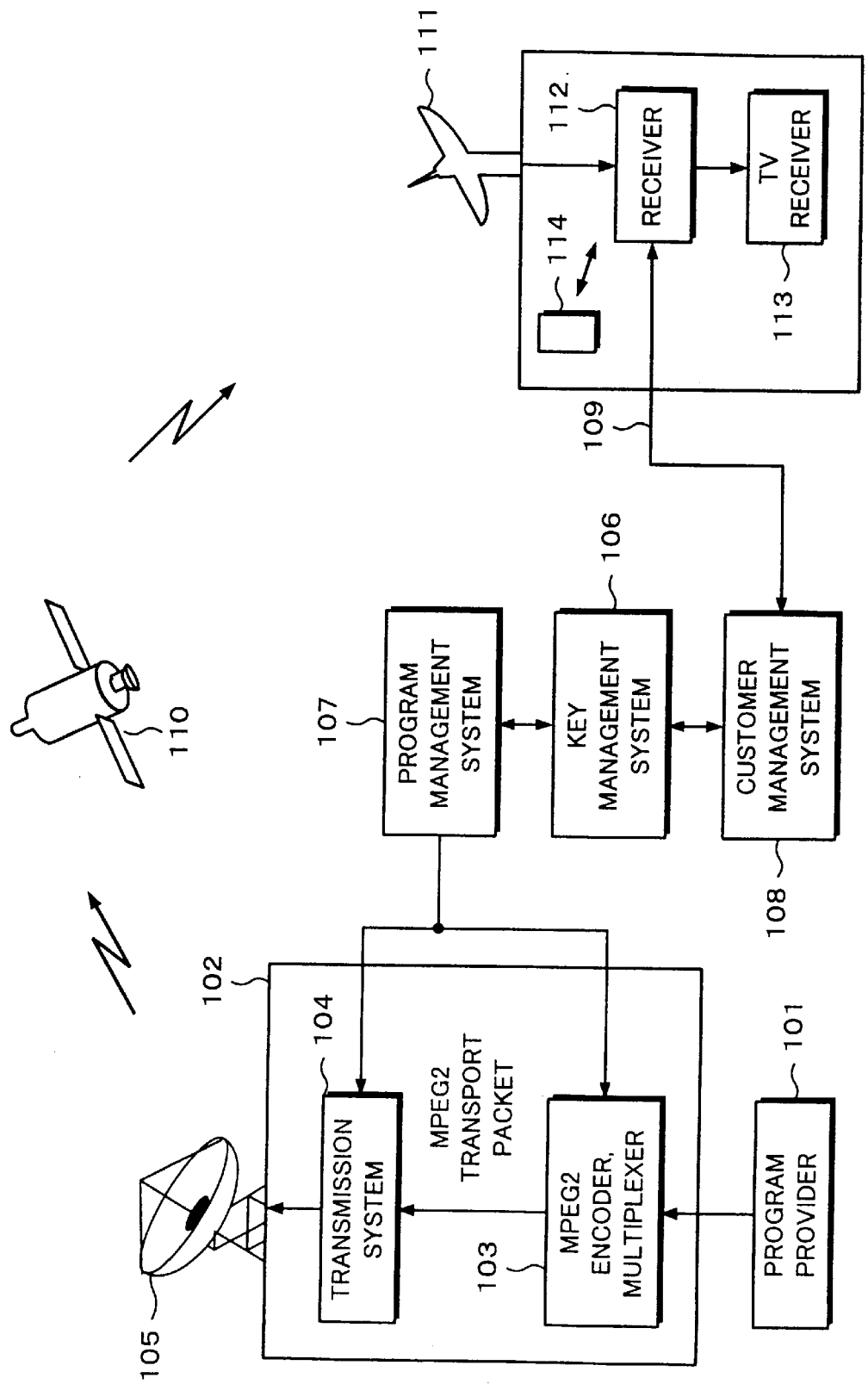
FIG. 4 is a schematic diagram showing an outline of a typical digital broadcasting system.

Although the digital satellite broadcasting system is constructed in a manner similar to that shown in FIG. 4, a more detailed construction mainly about the monitor control in the toll broadcasting is shown in FIG. 2. FIG. 2 shows a transmission side system and a reception side system. Both systems are connected by a transmission path 31 including a communication satellite, a broadcasting satellite, and the like and a telephone line 32 to up-load the monitor information.

The transmission side system will now be described. An encoder 33 converts the video signal and audio signal into digital signals and compresses the digital signals. Specifically speaking, for example, an MPEG2 encoder is used. An output of the encoder 33 is supplied to a multiplexing unit 34. In the multiplexing unit 34, the output of the encoder 33 and the control information are time-division multiplexed. A scrambling unit 35 scrambles the digital information by the scramble key. The EMM and ECM serving as control information are not scrambled.

The EMM is transmitted to the individual receiver and the ECM is the information associated with the program and they are the signals which are commonly transmitted to the program receiver. In a concerned information transmitting unit 36, the scramble key is encrypted by the work key and is transmitted as a part of the ECM. The work key is encrypted in a scramble management system 37 by an individual key peculiar to the receiver and is transmitted as a part of the EMM. In the scramble management system 37, the individual key is stored in correspondence to all of the receivers. That is, the scramble management system 37 receives the data of the EMM from a customer management system 38 and encrypts the data. In the scramble management system 37, a card ID, the individual key, and all of the circulated work keys are stored. A card ID and an individual key are newly generated and transferred to an IC card issuer, thereby allowing an IC card to be formed.

A customer management system 38 processes the monitor information which is up-linked from a number of receivers and contract requests from the viewers and transfers the contract information to the scramble management system 37. A program management system 39 controls the encoder 33 by the control signal in accordance with the program. And the program management system 39 generates a program number or the like, and supplies to the concerned information transmitting unit 36. The concerned information transmitting unit 36 mainly receives the ECM and encrypts.

On the receiver side, the EMM is previously fetched to an IC card 41 (shown at reference numeral 11 in FIG. 1) as one of security modules and is decoded by the EMM recorded in the IC card 41. The work key is taken out and stored in the IC card 41. The contract information in the EMM is stored.

In case of receiving a certain program, the receiver reads the ECM associated with the program into the IC card 41 and is collated with the contract information which has previously been fetched. If the received program is the contracted program, the scramble key in the ECM is decoded by using the work key and sent to a decoder 42. In the decoder 42, a descrambling is performed by an internal descrambling unit.

In case of the pay-per-view contract, a monitor career is stored in the IC card 41. After the elapse of a predetermined period, the monitor career is up-linked as monitor information to the customer management system 38 of the transmission side system through a telephone modem in the decoder 42. The IC card uses, for example, an 8-bit CPU of one chip. The individual key and the ID have been written in an EEPROM in the chip and cannot be rewritten by the user. The monitor information is also written in the EEPROM.

The control of the monitor control system in the toll broadcasting mentioned above will now be described. The descrambling is constructed by processes of three stages. First, the work key is decoded from the EMM by using the individual key of the receiver. Subsequently, the scramble key is decoded from the ECM by using the work key. The video data and audio data are descrambled by using the decoded scramble key.

When explaining in more detail, the EMM is transmitted to the viewer who normally made a contract, the encryption is decrypted by the first decoder, and the work key is stored into the IC card 41. The key which is used in the decoding is the key that is individual for each receiver. The individual key has previously been stored in the IC card 41. In the transmission side system, as mentioned above, the individual keys of the receivers and all of the ID numbers have been stored and the encrypted EMM is transmitted by using the individual key corresponding to the ID number of the receiver to be transmitted. The ID number has-been added to the non-encrypting portion of the EMM. In the receiver, the ID number is compared with the ID in the IC card 41. Only the EMM in which those IDs coincide is fetched into the IC card 41 and used.

When the program is monitored, the ECM associated with the program is fetched to the IC card 41. If the work key corresponding to the channel has previously been stored, the second decoder operates and the scramble key is obtained. The scrambled program signal is descrambled in the descrambling unit and is outputted as a signal which can be normally monitored.

Information of the work key, contracted channel ID, and contract type (temporary contract, pay-per-view, or the like) is included in the EMM. The work key is sent together with the key number and a plurality of work keys can be selectively used.

According to the embodiment of the invention, in a plurality of received program data, the packet of the video data and the packet of the audio data of the scrambled information and the ECM associated with the program are stored into the recording medium 20 through the digital interface 22. In this case, a corresponding relation between the program number as an ID of the program and the recording position of the program on the recording medium 20 is also recorded in the management table 21 concerned with the recording medium 20. The EMM having a possibility such that it will be changed in future by a change in contracted contents or the like is not recorded onto the recording medium 20.

After the recording to the recording medium 20, data for retrieving (browsing) the recorded information data is transmitted from an up-link station to the receiver. At the same time, the EMM as an individual information is also annexed and transmitted to the viewer who recorded the program. Processes in case of selectively reproducing the desired program from the recording medium 20 will now be described with reference to FIG. 3.

Figure 3:
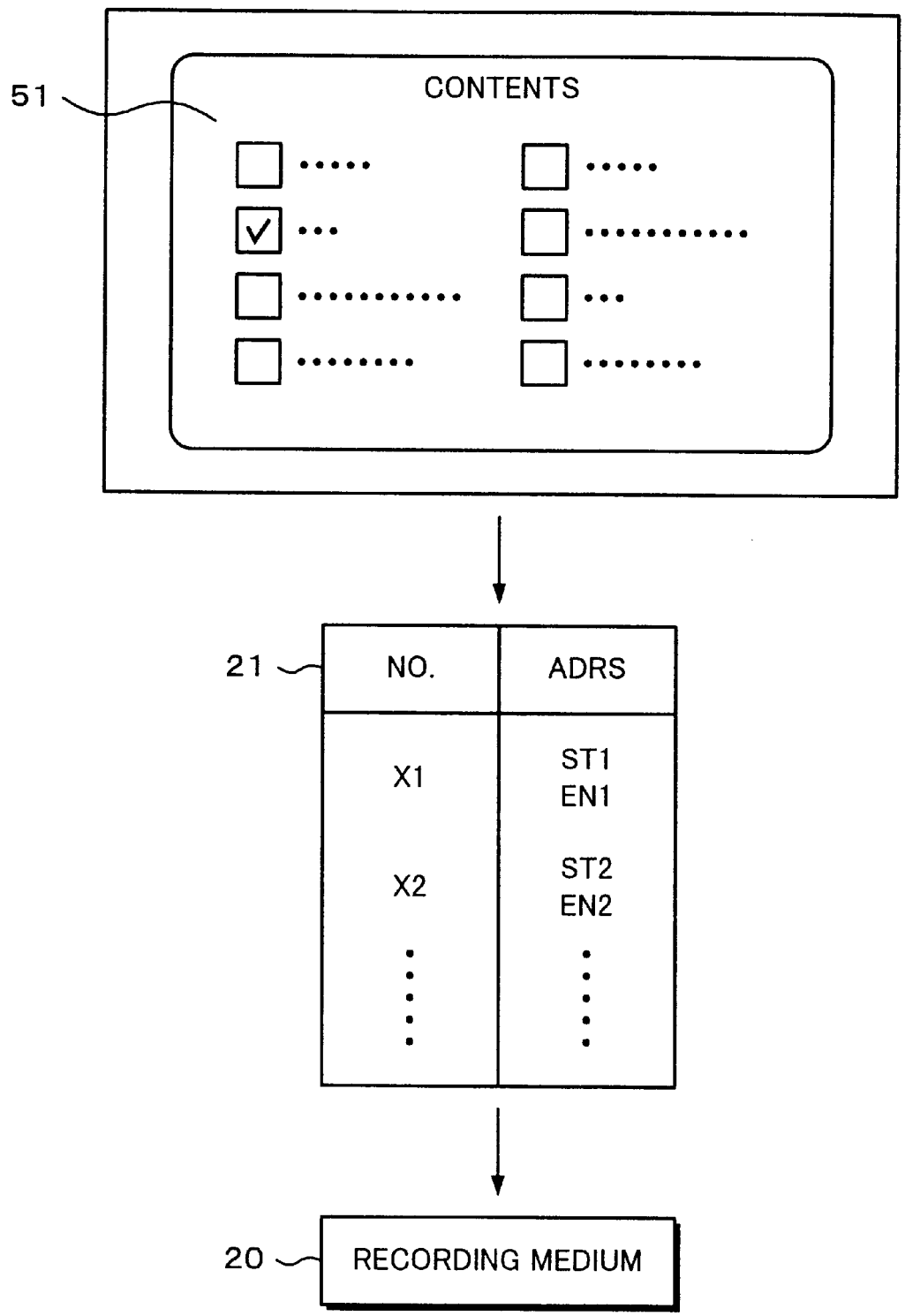
FIG. 3 is a schematic diagram for explaining the retrieving operation in the embodiment of the invention.

By the data for browsing sent from the up-link station to the viewer, contents as shown at 51 in FIG. 3 are displayed on the display of the viewer. That is, characters showing the contents 52 of the plurality of recorded programs and the buttons 53 for selection are included. The display 51 shown in FIG. 3 is one example. As another example, so long as a display such that the contents of the recorded programs are displayed and a desired one of the recorded programs can be selected, various displays can be used. The browser (software) has previously been stored as a program in the ROM of the receiver or is transmitted through the broadcasting wave and is down-loaded into the memory which is connected to the apparatus control unit 10.

The viewer designates a desired program to be reproduced by using a mouse or the like in the display 51 for browsing. When a certain program is designated, the program number corresponding to the program is supplied from the apparatus control unit 10 to the management table 21 through the digital interface 22, for example. As shown in FIG. 3, recording positions (start addresses ST1, ST2, . . . , and end addresses EN1, EN2, . . . ) on the recording medium 20 of program numbers X1, X2, . . . of the programs recorded on the recording medium 20 have been written in the management table 21. Therefore, by referring to the management table 21, the recording position of the program number designated in the display 51 of the browsing can be known.

The information of the desired program number and the corresponding recording position is sent to the recording medium 20 (more specifically speaking, reading or reproduction control unit). Thus, the video packet, audio packet, and ECM of the program of the desired program number are reproduced. The reproduced information is transmitted to the apparatus control unit 10 through the digital interface 22. In the apparatus control unit 10, the scramble key is generated as mentioned above by using the received latest EMM and the reproduced ECM. In the descrambling unit 5, the video packet and audio packet of the selected program are descrambled by using the scramble key. The separating unit 6 is controlled by the apparatus control unit 10 so as to select the data of the reproduced program. In a manner similar to the ordinary received program, the program by the reproduction data of the recording medium 20 can be monitored.

Although the example of transmitting the video and audio data through the broadcasting wave has been described above, the invention can be also applied to a system for transmitting the video and audio data by a radio transmission other than the broadcasting wave. Only one of the video data and the audio data can be also transmitted. Further, data of a computer program can be also transmitted without limiting to the video and audio data.

By transmitting the data for retrieval to the viewer after the recording, the viewer can easily perform the selecting operation of the desired program.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A transmitting apparatus for a digital broadcasting system for controlling access to scrambled programs based on a customer's most recent account information, comprising:

a scrambling unit for scrambling a program using a first encryption key; said first encryption key being specific to said program and generic to a plurality of receiving apparatuses; the scrambled program requiring both said first encryption key and a second encryption key to be unscrambled;

a first transmitter for transmitting the scrambled program along with the corresponding first encryption key to said plurality of receiving apparatuses; and a second transmitter for transmitting said second encryption key to a specific receiving apparatus in response to a request therefrom; said second encryption key being generic to a plurality of programs and specific to said specific receiving apparatus; said second encryption key being determined and updated periodically on the basis of said customer's present account information.

2. A receiving apparatus for a digital broadcasting system for controlling access to scrambled programs based on a customer's most recent account information, comprising:

a first receiver for receiving a scrambled program and a corresponding first encryption key from a transmitting apparatus; said first encryption key being specific to said program and generic to a plurality of receiving apparatuses;

a transmitter for periodically requesting a second encryption key from said transmitting apparatus;

a second receiver for receiving said second encryption key from said transmitting apparatus; said second encryption key being generic to a plurality of programs and specific to said receiving apparatus; said second encryption key being determined and updated periodically on the basis of said customer's present account information;

a recorder for recording said scrambled program and said corresponding first encryption key; said recorder also for recording the second encryption key most recently received from said transmitting apparatus;

a decoder for unscrambling said scrambled program using the corresponding first encryption key and the most recent second encryption key; said scrambled program and first encryption key being selectively provided by said first receiver or said recorder; and reproducing means for reproducing a program unscrambled by said decoder.

3. The receiving apparatus according to claim 2, further comprising managing means for managing a plurality of scrambled programs and corresponding first encryption keys recorded by said recorder.

4. A digital broadcasting system for controlling access to scrambled programs based on a customer's most recent account information, comprising:

a transmitting apparatus for transmitting programs to a plurality of receiving apparatuses, comprising:

a scrambling unit for scrambling a program using a first encryption key; said first encryption key being specific to said program and generic to said plurality of receiving apparatuses; the scrambled program requiring both said first encryption key and a second encryption key to be unscrambled;

a first transmitter for transmitting the scrambled program along with the corresponding first encryption key to said plurality of receiving apparatuses; and a second transmitter for transmitting said second encryption key to a specific receiving apparatus in response to a request therefrom; said second encryption key being generic to a plurality of programs and specific to said specific receiving apparatus; said second encryption key being determined and updated periodically on the basis of said customer's present account information; and at least one of said plurality of receiving apparatuses, comprising:

a first receiver for receiving the scrambled program and corresponding first encryption key from said transmitting apparatus;

a third transmitter for periodically requesting said second encryption key from said transmitting apparatus;

a second receiver for receiving said second encryption key from said transmitting apparatus;

a recorder for recording the scrambled program and corresponding first encryption key; said recorder also for recording the second encryption key most recently received from said transmitting apparatus;

a decoder for unscrambling said scrambled program using the corresponding first encryption key and the most recent second encryption key; said scrambled program and first encryption key being selectively provided by said first receiver or said recorder; and reproducing means for reproducing said program unscrambled by said decoder.

5. The digital broadcasting system according to claim 4, wherein said programs are digital television programs.

6. The digital broadcasting system according to claim 4, wherein said recorder and said reproducing means are a digital VCR.

* * * * *